US010394679B2

United States Patent
Yu et al.

(10) Patent No.: US 10,394,679 B2
(45) Date of Patent: Aug. 27, 2019

(54) LOCALITY-AWARE SCHEDULING FOR NIC TEAMING

(71) Applicant: Nicira, Inc., Palo Alto, CA (US)

(72) Inventors: Jia Yu, Sunnyvale, CA (US); Yong Wang, Sunnyvale, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 401 days.

(21) Appl. No.: 15/143,409

(22) Filed: Apr. 29, 2016

(65) Prior Publication Data

US 2017/0315840 A1    Nov. 2, 2017

(51) Int. Cl.
*G06F 11/30* (2006.01)
*G06F 11/34* (2006.01)
*G06F 15/17* (2006.01)

(52) U.S. Cl.
CPC ...... *G06F 11/3055* (2013.01); *G06F 11/3433* (2013.01); *G06F 15/17* (2013.01); *G06F 2212/2542* (2013.01)

(58) Field of Classification Search
None
See application file for complete search history.

(56) References Cited

U.S. PATENT DOCUMENTS

| 2003/0187914 | A1* | 10/2003 | Kaniyar | ............ | H04L 67/1002 |
| | | | | | 709/201 |
| 2012/0250512 | A1* | 10/2012 | Jagadeeswaran | ....... | H04L 47/12 |
| | | | | | 370/235.1 |
| 2014/0161122 | A1* | 6/2014 | Vasudevan | ............ | H04L 45/58 |
| | | | | | 370/389 |

\* cited by examiner

*Primary Examiner* — Wynuel S Aquino
*Assistant Examiner* — Melissa A Headly
(74) *Attorney, Agent, or Firm* — Adeli LLP (57) ABSTRACT

Some embodiments provide a method for distributing packets processed at multiple sockets across a team of network interface controllers (NICs) in a processing system. The method of some embodiments uses existing distribution (or selection) algorithms for distributing traffic across NICs of a NIC team (across several sockets), but augments the method to prioritize local NICs over remote NICs. When active NICs local to a socket associated with a packet are available, the method of some embodiments uses the selection algorithm to select from an array of the active local NICs. When active NICs local to the socket are not available, the method of some embodiments uses the selection algorithm to select from an array of the active NICs of other NICs on the NIC team.

17 Claims, 10 Drawing Sheets

LOCALITY-AWARE SCHEDULING FOR NIC TEAMING

BACKGROUND

Modern servers with two or more processors employ architectures with multiple sockets, each with processor cores, memory, etc., that operate on a single motherboard. Some multi-socket architectures use a non-uniform memory architecture (NUMA) for memory access by the multiple processors of the multiple sockets. NUMA allows for processors on the different sockets to have access to a memory local to the socket, while also providing access to a shared pool of memory (e.g., the local memory of other sockets). The memory access times for the processor cores of the different sockets varies depending on the location of the memory relative to the socket (e.g., local memory accesses are faster than remote memory accesses). Accessing memory directly attached to the socket is faster than accessing memory in remote sockets because there is a performance penalty when traversing inter-CPU links (e.g., Intel QuickPath Interconnect (QPI)) to access memory in a remote socket.

In addition to local and remote memories, the sockets have a locality for other devices (e.g., network interface controllers (NICs), Peripheral Component Interconnect Express (PCIe) devices, etc.). In some cases, teaming is implemented for the devices of the multiple sockets, in which a group of the devices operates as a single logical element. For example, NIC teaming (or link aggregation) allows multiple NICs to operate as a single logical NIC, providing various benefits (e.g., bandwidth aggregation, link redundancy, and/or load balancing). NIC teaming can be implemented by physical switches, operating systems, hypervisors (e.g., VMWare's ESX hypervisor).

The locality of NICs (or other devices) to the sockets of a multi-socket architecture is an important characteristic to consider when configuring NIC team scheduling with high performance. For example, in a network input/output (I/O) application context, placing packets in memory attached to a local socket, processing them on local processor cores, and transmitting them on local NICs would be more efficient than a workload placement that involves cross-socket memory access. Existing load balancing algorithms/scheduling are not optimized for multi-socket architectures.

BRIEF SUMMARY

Some embodiments provide a method for distributing packets processed at multiple sockets across a team of network interface controllers (NICs) in a processing system. The method of some embodiments uses existing distribution (or selection) algorithms for distributing traffic across NICs of a NIC team (across several sockets), but augments the method to prioritize local NICs over remote NICs. Each socket includes a set of processing cores and is associated with, or has an affinity to, a portion of other system resources (e.g., memory, NICs, other devices, etc.) available in the processing system.

In a non-uniform memory access (NUMA) configuration, the sockets share a pool of memory over a set of interconnects between the different sockets. Each socket also has a set of local memory that is a part of the pool (and can be shared), but with which the socket can achieve faster access times. In some embodiments, some of the sockets also have a corresponding set of network interface controllers (NICs) that are local (or affinitized) to the socket, allowing for faster performance.

NIC teaming allows for the several NICs of the multiple sockets to function as a single logical entity, providing for bandwidth aggregation and link redundancy. In some embodiments, NIC teaming leverages multiple cores for parallel packet processing such that the processing of each packet is affinitized to one core. The method of some embodiments is performed by a NIC teaming scheduler that is augmented with locality information of NIC devices for a set of teams, and is compatible with existing load balancing algorithms (i.e. L2-L4 header based hashing). The method uses the load balancing algorithms to distribute traffic over local, active NICs of the team before looking for remote NICs of the NIC team.

The method of some embodiments identifies a socket associated with a packet. The identified socket of some embodiments is the socket at which the packet was processed or from which the packet originates. In some embodiments, the identified socket is the socket which is local to the memory at which the packet is stored.

The method then identifies a set of NICs over which to distribute packets associated with the socket. In some embodiments, the method identifies the active local NICs (e.g., NICs with which the identified socket has an affinity). The method of some embodiments detects the status (e.g., active, inactive, disconnected, etc.) for each NIC of a NIC team, and stores the status and an identifier for the associated socket in a data structure (e.g., a table, map, multi-dimensional array, etc.). The method of some embodiments monitors the NICs of the team to update the stored statuses. When no active local NICs are available, the method of some embodiments identifies all of the other active NICs within the team. In some embodiments, the method identifies the set of NICs based on the data structure, which includes a mapping of the different sockets to the active NICs available on each socket.

Once the method has identified the set of NICs, the method selects a particular NIC of the set of NICs. In some embodiments, the particular NIC is selected based on a load balancing algorithm or other method for distributing packets amongst the NICs of the team. The method of some embodiments distributes the packets based on a hash of a portion of the packet (e.g., L2, L3, L4 headers, etc.) and the load balancing algorithm. The method then sends the packet to the selected NIC. In some embodiments, when the method sends the packet to a NIC on a remote socket (e.g., a socket other than the socket at which the packet was processed), the packet is sent along a set of interconnects (also referred to as inter-CPU links and inter-socket bridges) to the remote socket. Scheduling packets for NIC teams based on the localities of the NICs relative to the sockets allows for optimized processing of the packets.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for distributing packets processed at multiple sockets across a team of network interface controllers (NICs) in a processing system. The method of some embodiments uses existing distribution (or selection) algorithms for distributing traffic across NICs of a NIC team (across several sockets), but augments the method to prioritize local NICs over remote NICs. Each socket includes a set of processing cores and is associated with, or has an affinity to, a portion of other system resources (e.g., memory, NICs, other devices, etc.) available in the processing system.

In a non-uniform memory access (NUMA) configuration, the sockets share a pool of memory over a set of interconnects between the different sockets. Each socket also has a set of local memory that is a part of the pool (and can be shared), but with which the socket can achieve faster access times. In some embodiments, some of the sockets also have a corresponding set of network interface controllers (NICs) that are local (or affinitized) to the socket, allowing for faster performance.

NIC teaming allows for the several NICs of the multiple sockets to function as a single logical entity, providing for bandwidth aggregation and link redundancy. In some embodiments, NIC teaming leverages multiple cores for parallel packet processing such that the processing of each packet is affinitized to one core. The method of some embodiments is performed by a NIC teaming scheduler that is augmented with locality information of NIC devices for a set of teams, and is compatible with existing load balancing algorithms (i.e. L2-L4 header based hashing). The method uses the load balancing algorithms to distribute traffic over local, active NICs of the team before looking for remote NICs of the NIC team.

The method of some embodiments identifies a socket associated with a packet. The identified socket of some embodiments is the socket at which the packet was processed or from which the packet originates. In some embodiments, the identified socket is the socket which is local to the memory at which the packet is stored.

The method then identifies a set of NICs over which to distribute packets associated with the socket. In some embodiments, the method identifies the active local NICs (e.g., NICs with which the identified socket has an affinity). The method of some embodiments detects the status (e.g., active, inactive, disconnected, etc.) for each NIC of a NIC team, and stores the status and an identifier for the associated socket in a data structure (e.g., a table, map, multi-dimensional array, etc.). The method of some embodiments monitors the NICs of the team to update the stored statuses. When no active local NICs are available, the method of some embodiments identifies all of the other active NICs within the team. In some embodiments, the method identifies the set of NICs based on the data structure, which includes a mapping of the different sockets to the active NICs available on each socket.

Once the method has identified the set of NICs, the method selects a particular NIC of the set of NICs. In some embodiments, the particular NIC is selected based on a load balancing algorithm or other method for distributing packets amongst the NICs of the team. The method of some embodiments distributes the packets based on a hash of a portion of the packet (e.g., L2, L3, L4 headers, etc.) and the load balancing algorithm. The method then sends the packet to the selected NIC. In some embodiments, when the method sends the packet to a NIC on a remote socket (e.g., a socket other than the socket at which the packet was processed), the packet is sent along a set of interconnects (also referred to as inter-CPU links and inter-socket bridges) to the remote socket. Scheduling packets for NIC teams based on the localities of the NICs relative to the sockets allows for optimized processing of the packets.

An overview of the process for scheduling packets across NICs of a NIC team in a multi-socket architecture has been described above. Further details and examples of locality-aware packet scheduling are described below. Specifically, Section I describes a NUMA architecture with a scheduler for distributing packets to NICs of NIC team in the NUMA architecture. Section II describes processes for configuring the scheduler to prioritize local NICs. Section III then describes examples of scheduling and distributing packets to different NICs in a NUMA architecture. Finally, section IV describes an electronic system with which some embodiments of the invention are implemented.

I. Scheduler for a NIC Team

Figure 1:
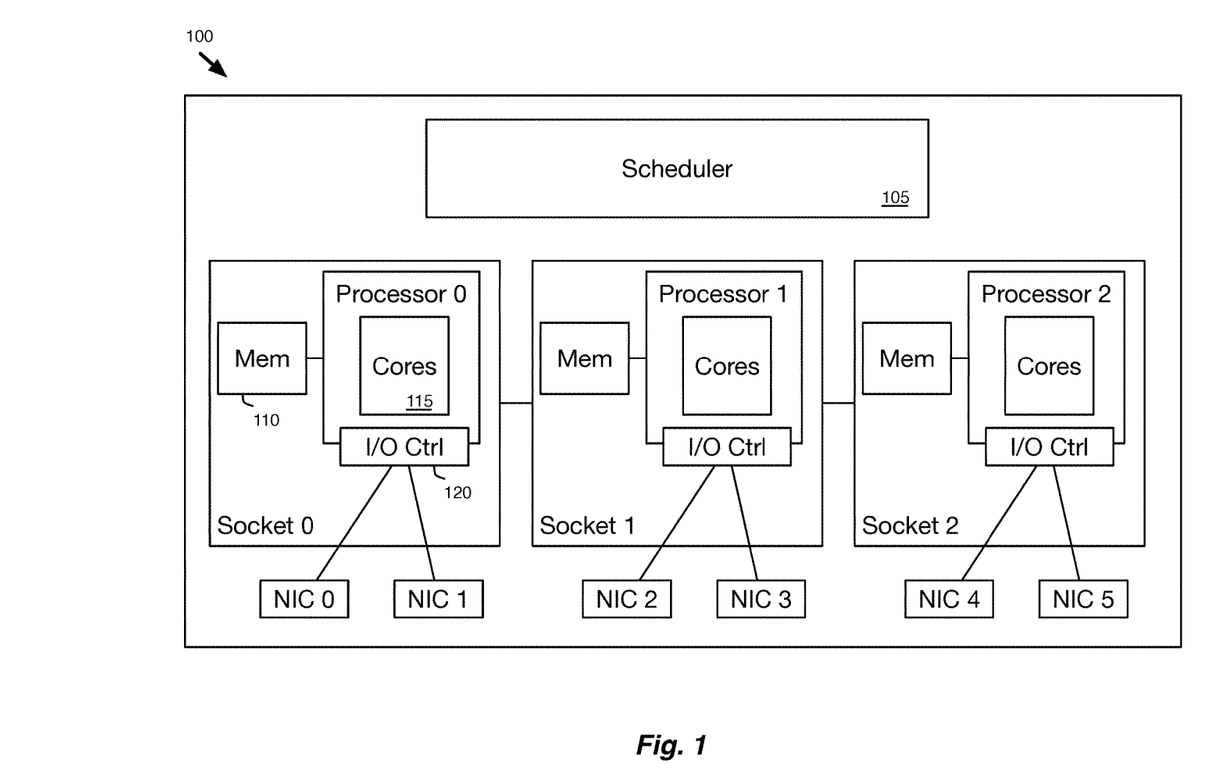
FIG. 1 illustrates an example of a NUMA architecture with a scheduler for distributing packets processed at different sockets of a motherboard.

With NIC teaming, a scheduler is used to distribute packets processed by the processor cores of the different sockets across the NICs of the NIC team. FIG. 1 illustrates an example of a NUMA architecture with a scheduler for distributing packets processed at different sockets of a motherboard. This example illustrates a motherboard 100 with a scheduler 105, three sockets 0-2, and six NICs 0-5. NICs 0 and 1 are associated with (e.g., have an affinity to or are located near) socket 0. NICs 2 and 3 are associated with socket 1, and NICs 4 and 5 are associated with socket 2.

NIC teaming allows for several NICs of multiple sockets to function as a single logical entity, providing for bandwidth aggregation and link redundancy. In this example, the scheduler 105 is responsible for dispatches packets to multiple NICs (of a NIC team) by determining which NIC that a packet should be sent out upon. In some embodiments, the scheduler 105 is a part of the operating system (e.g., bonding driver in Linux) that aggregates multiple network interfaces into a single logical interface. The scheduler 105 bases the packet-sending decisions based on a locality (e.g., affinity, physical proximity, etc.) of the available NICs on the NIC team.

In this example, each socket (i.e., Sockets 0-2) includes a processor with processor cores 115, a local memory 110, and an input/output (I/O) controller 120. The memories 110 are shared amongst the different sockets, but local accesses (i.e., accesses to memory 110 on the same socket as the processor core 115) are fastest, as the access does not need to go across interconnects (e.g., Intel QuickPath Interconnect (QPI)) between the different sockets. The processor cores 115 are the elements that perform various operations on data stored in the memories 110. The I/O controller 120 manages data communications between the socket and other elements (e.g., NICs, storage, etc.) of the motherboard 100. In some embodiments, the locality of a socket with other elements is based on connections between the I/O controller of a socket and the element (e.g., a NIC is local to a particular socket when the I/O controller of the particular socket directly communicates with the NIC).

NICs 0-5 of some embodiments are physical NICs that connect the computer to a network. In some embodiments, the NICs connect to a physical switch that directly connects to NICs of other machines in the network. In virtual networking and software defined network, the physical NICs are linked to virtual switches to provide network connectivity between servers. Although this example is shown with three sockets and two NICs per socket, one skilled in the art will recognize that the invention is not limited to any particular configuration.

Scheduler 105, which distributes traffic to the different NICs of a NIC team, is orthogonal to the load balancing algorithms used in NIC teaming. A locality-aware scheduler 105 is not limited to any particular load balancing algorithm. Besides packet header based hashing, this invention is compatible with various other selection algorithms (e.g., port based load balancing, balancing based on NIC capacity and/or run time workload, etc.).

The traffic distribution of scheduler 105 is also orthogonal to task/thread scheduling done in a CPU scheduler (not shown). A CPU scheduler assigns CPU share to different tasks/threads, and may consider the locality of memory to a socket, but does not decide the best NIC device for transmitting packets. Scheduler 105 accounts for the locality of the NICs of a NIC team when distributing packets that are processed by the different sockets for the NIC team. The following section describes examples for configuring the scheduler with the NIC team and socket information.

II. Scheduler Configuration

In order to distribute packets for the different NICs of a NIC team, the scheduler of some embodiments needs to be configured with the NIC team and socket information. The scheduler of some embodiments distributes packets for multiple different teams of NICs. Each NIC team can be configured to distribute traffic among its different team members using different distribution algorithms.

Figure 2:
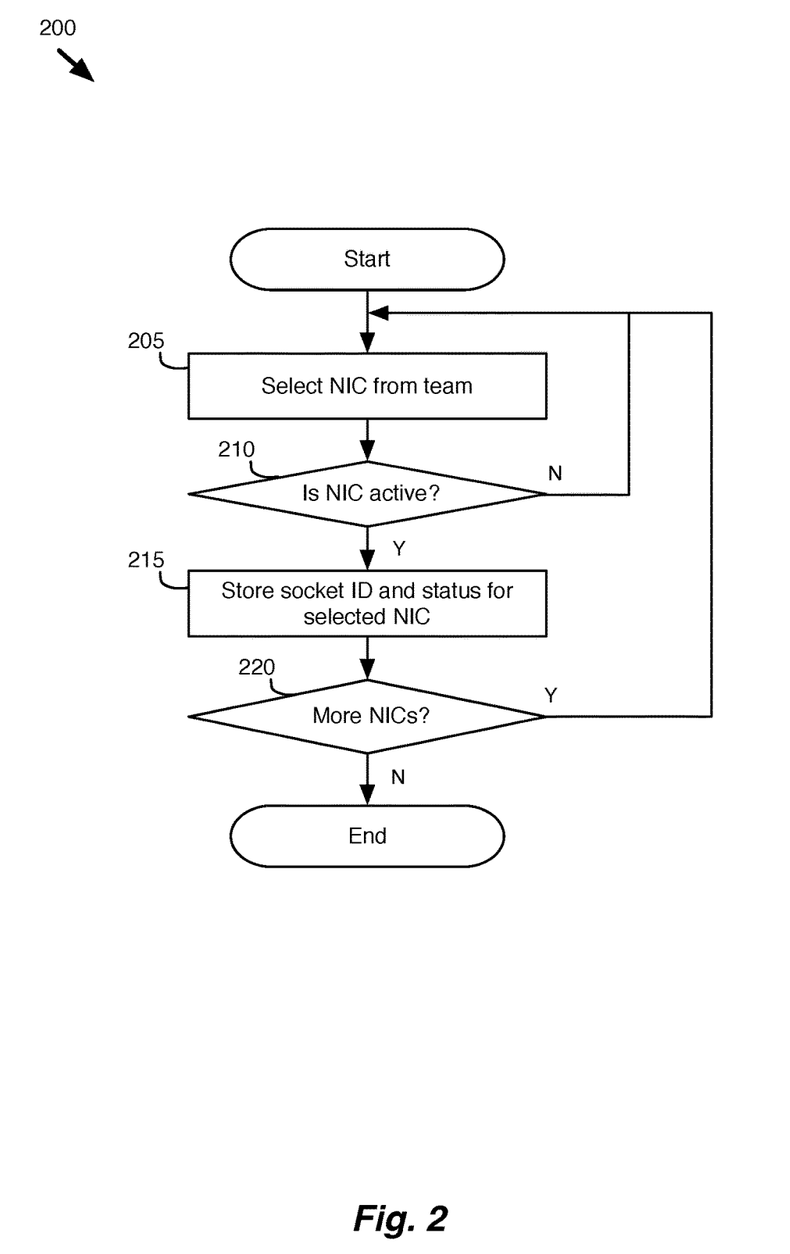
FIG. 2 conceptually illustrates a process for updating mappings between sockets and their corresponding active NICs.

FIG. 2 conceptually illustrates a process for updating mappings between sockets and their corresponding active NICs. In some embodiments, the process 200 is performed when a team configuration is created or modified. The process 200 of some embodiments is performed when a link status for one of the NICs of a team changes.

The process 200 of some embodiments is performed by a scheduler, as described above with reference to FIG. 1, that operates on a motherboard to implement NIC teaming. In some embodiments, the scheduler manages NICs for multiple teams. The NIC teams are defined, in some embodiments, by a user configuration that defines NIC team constructs and assigns the NICs to the teams. The process 200 selects (at 205) one of the NICs from the team.

The process 200 then determines (at 210) whether the selected NIC is active. A NIC of some embodiments is active when it is connected to a network. A NIC may not be active because it has been disconnected or disabled (e.g., by an administrator), or when it has failed. When the process 200 determines (at 210) that the selected NIC is not active, the process selects (at 205) another NIC from the team.

When the process 200 determines (at 210) that the selected NIC is active, the process stores (at 215) the NIC's status and a socket identifier (ID) for the socket associated with the selected NIC. The socket identifier of some embodiments is a unique identifier for each socket. In some embodiments, the associated socket is a socket that is directly connected (e.g., through the I/O controller) to the selected NIC. The socket ID and the active NIC statuses are stored in different data structures in different embodiments.

For example, in some embodiments, for each NIC team construct created from a user configuration, the process 200 maintains a 2-dimensional array (e.g., active_nics_on_socket[sock][nic]). The first dimension is indexed using the socket ID of the processor core that's transmitting packets through the NIC team. The second dimension is a list of active NICs that are located in this socket. In some embodiments, the process 200 also stores the number of active NICs on each socket (i.e. num_active_nics_on_socket[sock]), which is used in a modulo function in conjunction with a selection algorithm, as described below. In some embodiments, the socket ID, active NICs, and number of active NICs are all stored in a single data structure.

The process 200 then determines (at 220) whether there are more NICs to check for the NIC team. When the process 200 determines (at 220) that there are more NICs the process selects (at 205) the next NIC. When the process 200 determines (at 220) that there are no more NICs, the process ends. Although the process 200 is described as iteratively processing each NIC, in some embodiments, the process 200 updates the active NIC array for a group of the NICs (e.g., all of the NICs on a particular socket) in a single operation.

Figure 3:
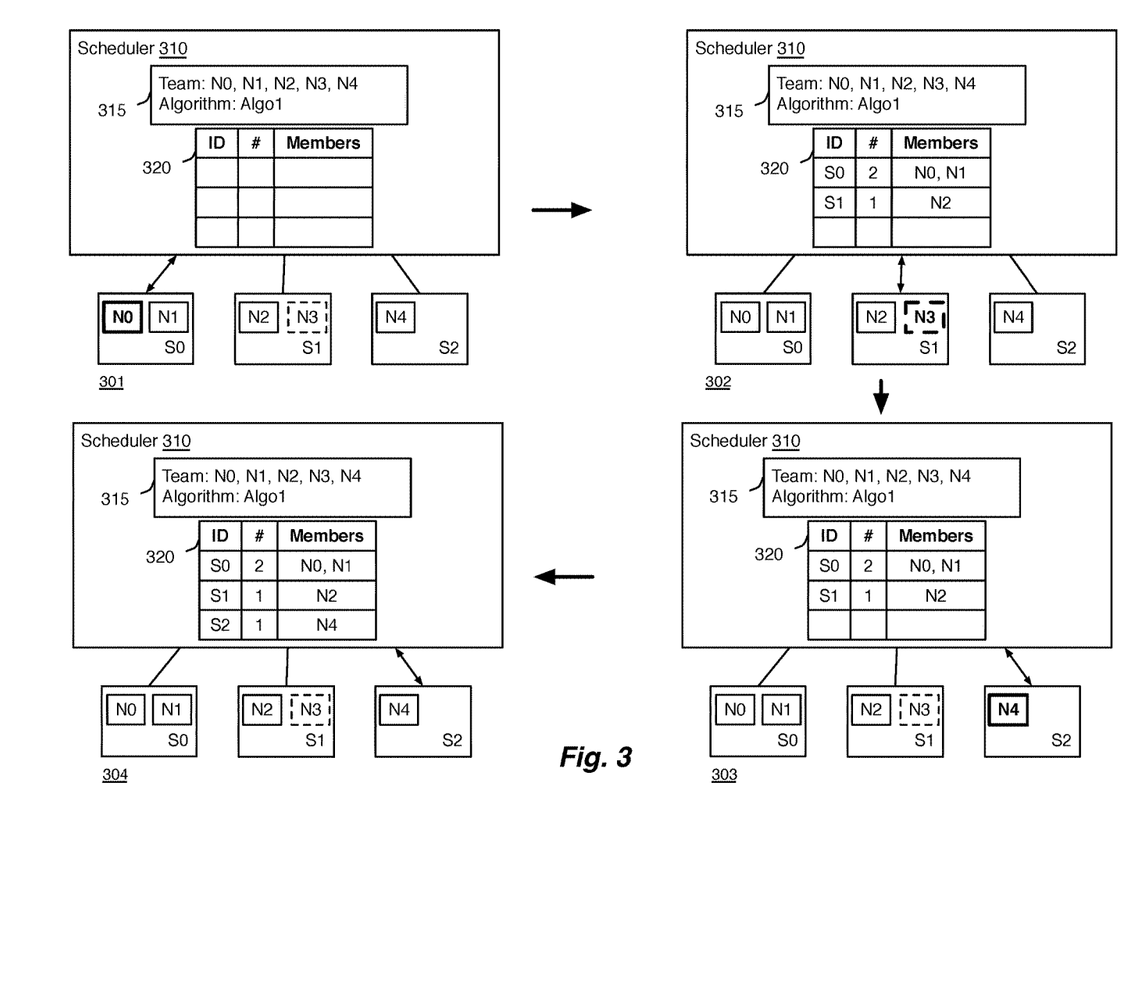
FIG. 3 illustrates an example of configuring a scheduler for link aggregation.

FIG. 3 illustrates an example of configuring a scheduler for link aggregation in four stages 301-304. This example shows a scheduler 310 that distributes packets for a NIC team that includes NICs N0-N4 on sockets S0-S2. The scheduler 310 is similar to the scheduler 105 described above with reference to FIG. 1.

The first stage 301 shows scheduler 319 with a NIC team configuration 315, which defines the members (N0-N4) of the NIC team, as well as an algorithm (Algo1) for distributing packets across the team members. The configuration 315 describes a user configuration that provides static information of team members for a NIC team. The static information of NIC teaming configuration 315 includes membership (i.e. which NICs belong to team) and a load balancing algorithm (i.e. L2-L4 header based bashing, explicit fail-over). In some embodiments, configuration 315 also includes other protocol specific information (e.g., a timeout threshold in LACP state machine, etc.).

Scheduler 310 also includes a data structure 320. Data structure 320 is a data structure (e.g., a table, list, multidimensional array, etc.) for storing NIC team information. In this example, each record of the data structure 320 is for storing information for the different team members, including a socket ID (e.g., S0), a number of active NICs, and a list of the active members (i.e., NICs) associated with the socket ID. Data structure 320 is shown as a table with records, but in other embodiments, the data structure 320 is a multidimensional array, list, or other data structure.

In addition to the static state of the NIC teams defined in the configuration 315, scheduler 310 maintains (in data structure 320) the runtime state of team members as determined by the link state (or status) of each NIC. In the first stage 301, scheduler 310 scheduler 310 determines that the first NIC N0 is active and is located on socket S0.

The second stage 302 shows that, upon determining that NIC N0 is active, scheduler 310 stores a record for the first NIC N0 in the data structure 320, mapping socket ID (S0) to an active team member N0, and providing the number of active team members (i.e., 1) for the socket S0. Scheduler 310 has also determined the statuses of NICs N1 and N2 and stored them in the data structure 320. NIC N1 is stored in a list with NIC N0 because they are local to the same socket S0, while N2 is stored in a separate record for socket S1.

The second stage 302 also shows that scheduler 310 determines the status of NIC N3 on socket S1. In some cases, a NIC that is part of a NIC team is not active or otherwise available. For example, a cable for the NIC may be disconnected, the NIC may be disabled by the system, etc. If a NIC is link down, this NIC is excluded from active NICs. In the third stage 303, scheduler 310 has determined that NIC N3 on socket S1 is inactive (as indicated by the dashed lines). N3 is not added to the data structure 320.

In the third stage 303, scheduler 310 also checks the status of NIC N4. Finally, in the fourth stage 304, scheduler 310 determines that N4 is active and adds a record for N4 on socket S2 to the data structure 320. Once scheduler 310 has completed updating the status and associated socket for each of the team members, it can distribute packets to the various team members according to the distribution algorithm Algo1, described in the configuration 315.

In some embodiments, in addition to updating the runtime status of a NIC team (e.g., member statuses) at configuration, the scheduler continues to monitor the NICs to detect changes in status for the different team members. When the link status of a NIC changes at run time, the data structure that is used to track the status of the NIC teams needs to be updated to maintain a current view of the NIC team members.

Figure 4:
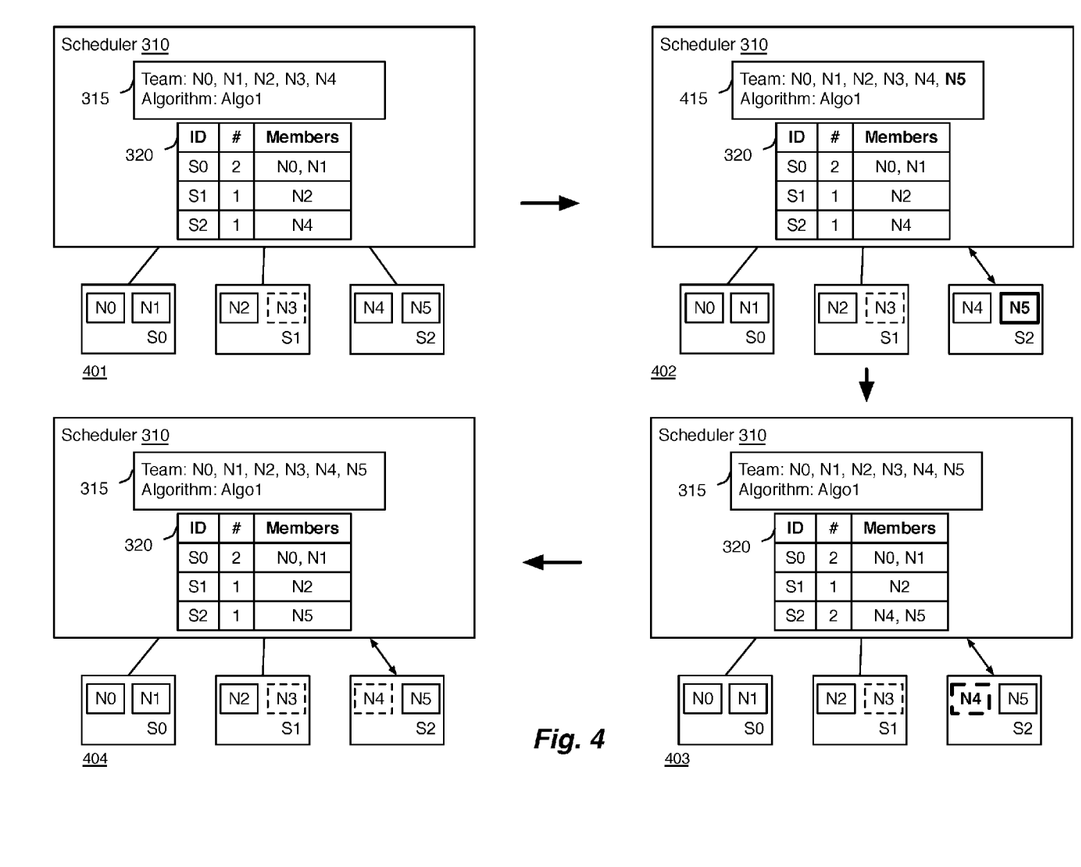
FIG. 4 illustrates an example of updating NIC statuses for a scheduler.

FIG. 4 illustrates an example of updating NIC statuses at runtime. The first stage 401 shows that the data structure 320 has been updated with the statuses of the NIC team members N0-N5 (with N3 being inactive). N5 is another NIC on socket S2 that is not yet a member of the NIC team.

When a user adds or removes a NIC to/from a team, the data structure 320 that stores the runtime information for the NIC team needs to be updated. The second stage 402 shows user configuration 415 has been updated to add NIC N5 to the NIC team. Scheduler 310 checks the status of the new NIC N5, and in the third stage 403, data structure 320 has been updated with the status of the new NIC team member, N5.

In addition to when changes are made in the user configuration, the data structure 320 also needs to be updated when the status of a current team member changes. The third stage 403 shows that the record for socket S2 indicates that it now has two members, N4 and N5. However, the third stage 403 also shows that NIC N4 of socket S2 has become inactive. This may occur when the NIC fails or is manually disconnected from the network.

In the fourth stage 404, scheduler 310 has updated data structure 320 to update the number of active members for socket S2 back to one (having added NIC N5 and removed NIC N4 from the list of active members). Scheduler 310 of some embodiments actively monitors the status of the NICs periodically, or continuously. Alternatively or conjunctively, scheduler 310 of some embodiments receives status updates from the various NICs with the status of the NIC.

III. Packet Scheduling

Figure 5A:
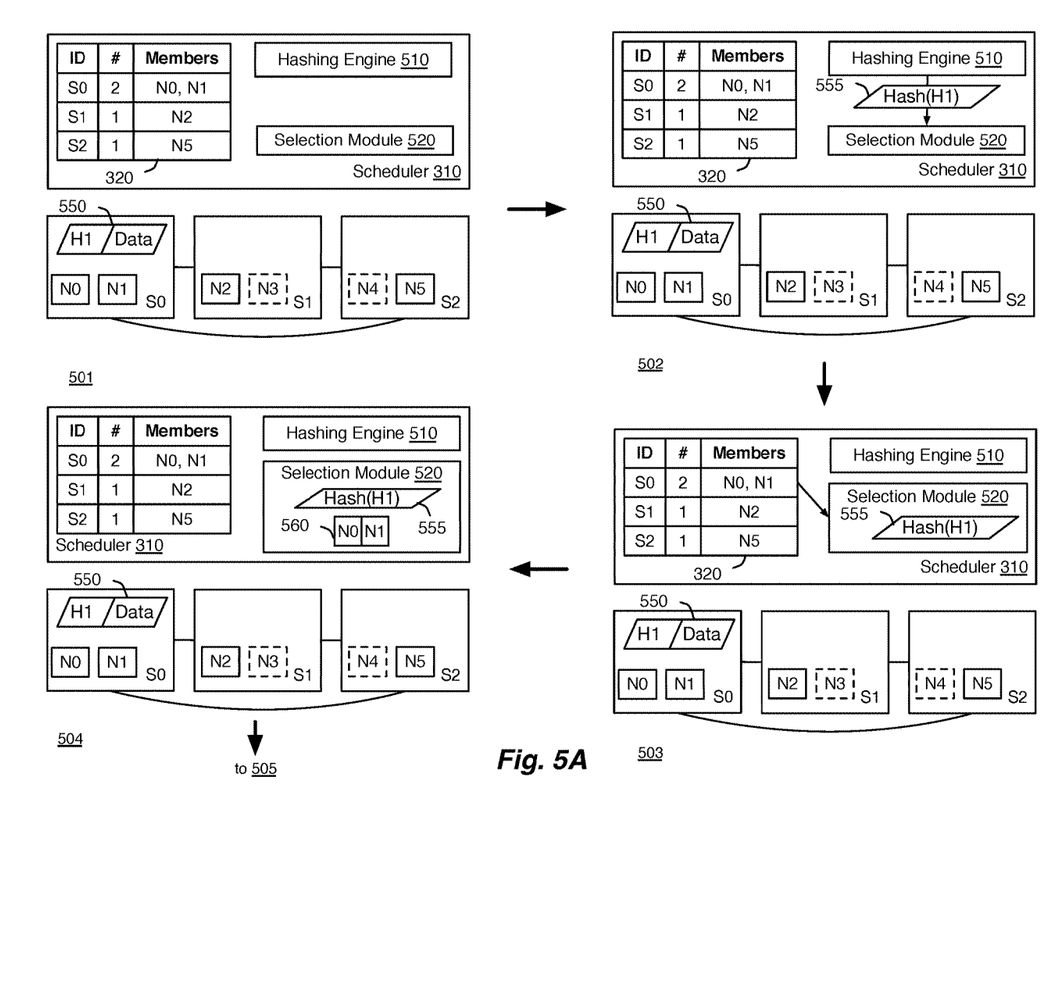
FIGS. 5A-B conceptually illustrates an example of scheduling packets to local NICs.
Figure 5B:
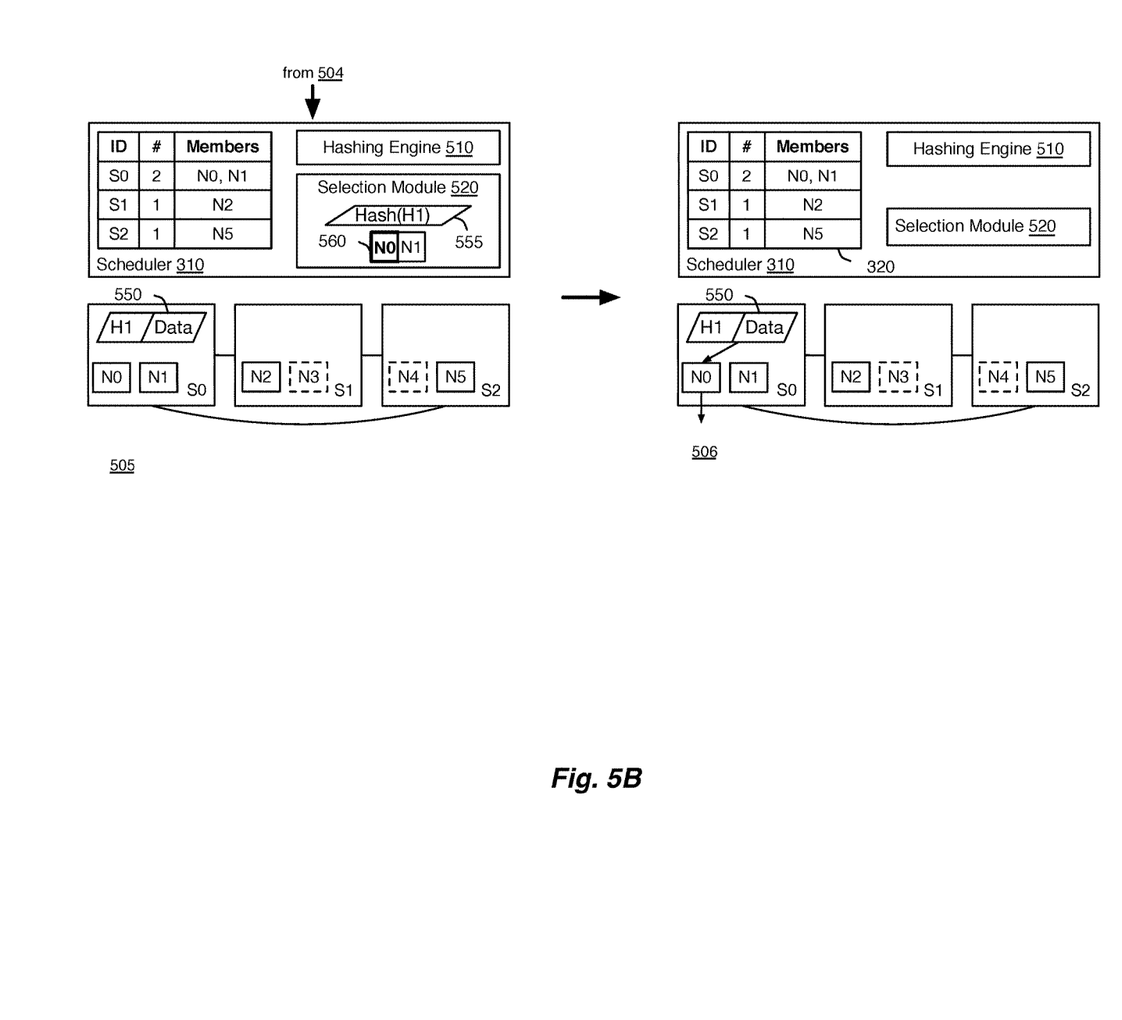

FIGS. 5A-B conceptually illustrates an example of scheduling packets to local NICs in six stages 501-506. The first stage 501 shows a scheduler 310 for a NIC team with NICs N0-N5 on sockets S0-S2, as described above with reference to FIG. 4. Scheduler 310 includes data structure 320 with active team members N0, N1, N2, and N5. Scheduler 310 also includes a hashing engine 510 and selection module 520. In the first stage 501, a packet 550, with header and data portions, is ready to be sent from socket S0 through an outgoing NIC.

In the second stage 502, hashing engine 510 of scheduler 310 calculates a hash 555 based on the header (H1) of the packet 550. In some embodiments, scheduler 310 uses the calculated hash to select a NIC team member from a group of NIC team members (e.g., using a modulo function as a part of the selection algorithm). In some embodiments, hashing engine 510 calculates a hash based on other elements (e.g., a port) associated with the packet. While hashing of the header is an element of many selection algorithms, it is not necessary to the invention. For example, some selection algorithms select a NIC team member based on load and capacity for the NIC team members.

The third stage 503 shows that the selection module 520 identifies an array of members from data structure 320, from which the outgoing NIC is to be selected. In this example, because the socket S0 for the packet 550 has active members, selection module 520 identifies a list of active members that includes all of the local active NICs (N0 and N1) of socket S0. The fourth stage 504 shows that array 560 is populated with the active team members of the identified socket S0.

In the fifth stage 505, selection module 520 selects one of the team members from array 560. The selection process of some embodiments is based on a user configuration that identifies a selection algorithm (e.g., a hash-based load balancing algorithm, port based load balancing, balancing based on NIC capacity and/or run time workload, etc.). In this example, selection module 520 uses the hash 555 of the header H1, in conjunction with an identified selection algorithm (e.g., a hash-based load balancing algorithm) to select NIC N0 from array 560. Finally, in the sixth stage 506, packet 550 is sent from socket S0 through NIC N0.

Figure 6A:
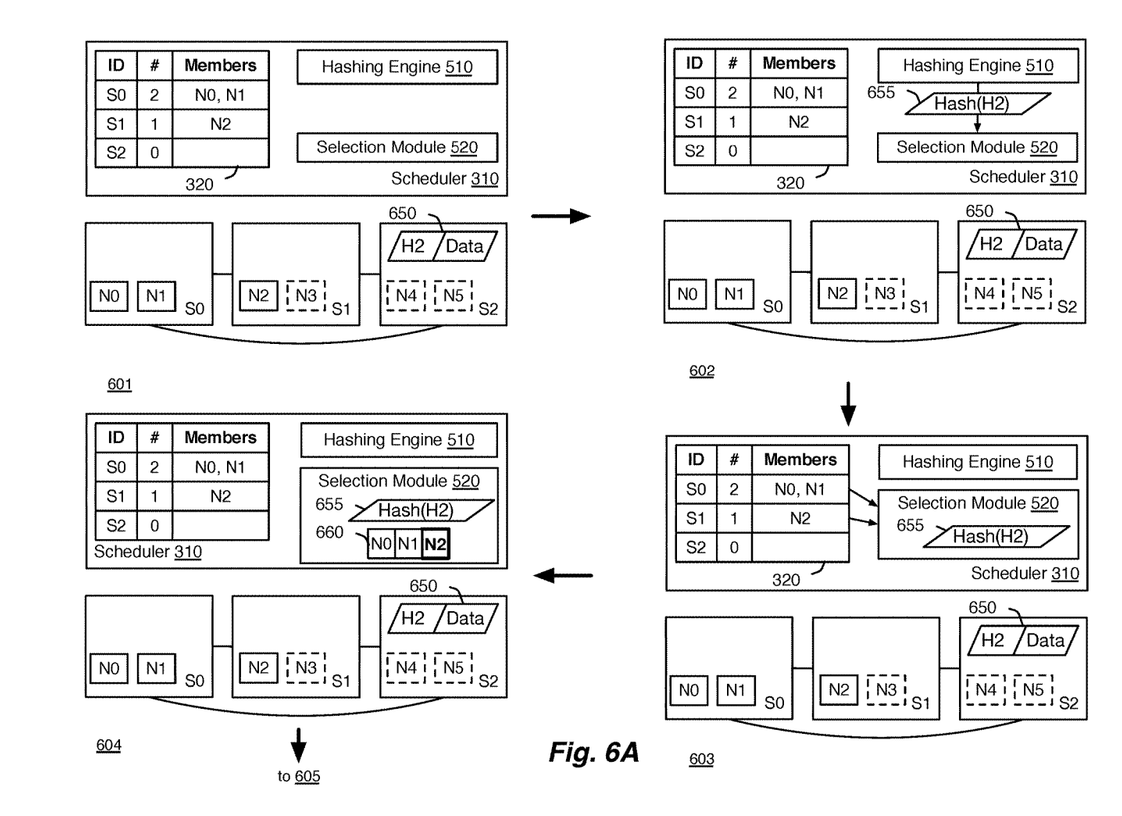
FIGS. 6A-B conceptually illustrates an example of scheduling packets to remote NICs.
Figure 6B:
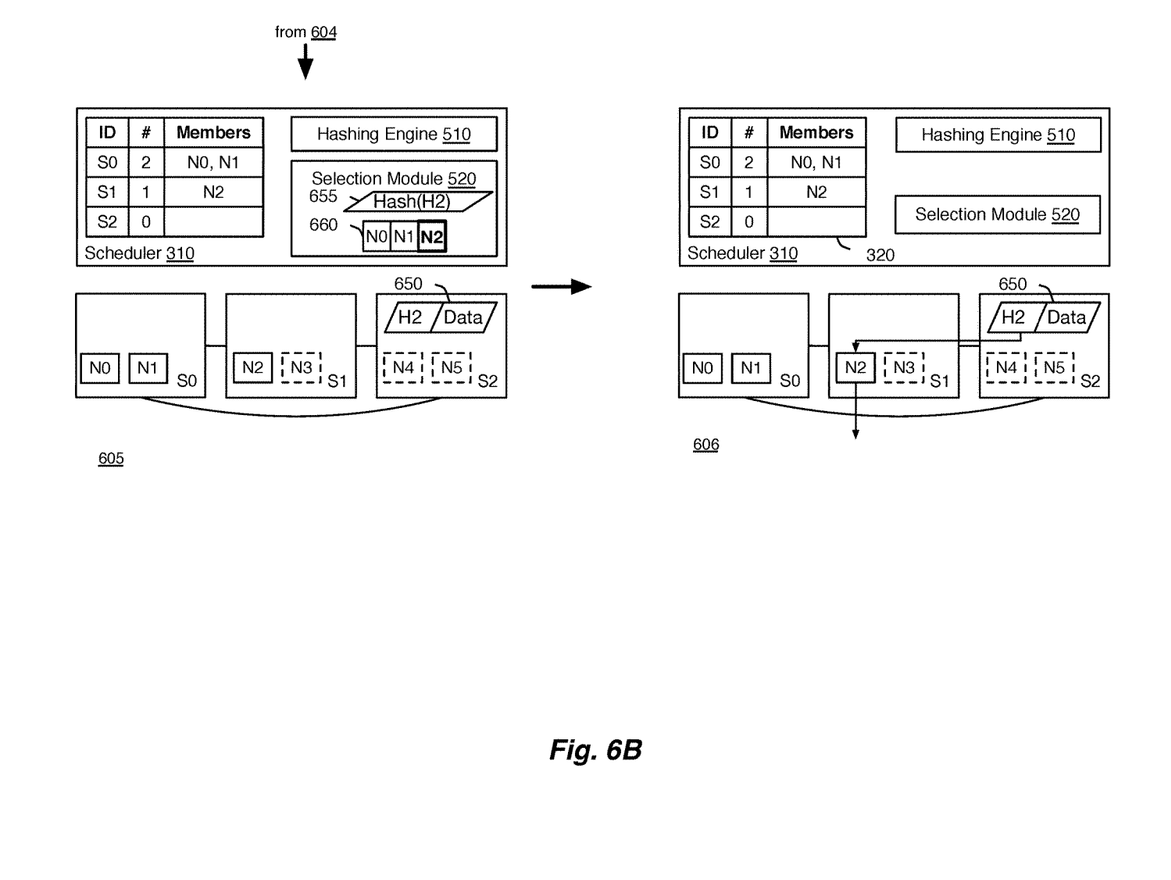

FIGS. 6A-B conceptually illustrates an example of scheduling packets to remote NICs. The first stage 601, like the first stage 501 of FIG. 5, illustrates a scheduler 310 that manages packets for a team of NICs N0-N5 on sockets S0-S2. In this example, NIC N3 of socket S1 and NICs N4 and N5 of socket S2 are disabled or otherwise unavailable. In some embodiments, a socket may be identified as a part of a team, but may have no active local NICs. The local NICs may be disabled, disconnected, or the socket may simply have no local NICs to begin with. The first stage 601 shows that a packet 650 is to be sent from socket S2.

In the second stage 602, hashing engine 510 of scheduler 310 calculates a hash 655 based on the header (H2) of the packet 650. The third stage 603 shows that the selection module 520 identifies a list of members from data structure 320. In this example, because the socket S2 for the packet 650 has no active members, selection module 520 identifies a list of all of the active NICs for the remaining sockets of the team (NICs N0, N1, and N2). Some embodiments use additional criteria to select the list of active members when the socket has no active members. For example, in some embodiments, scheduler 310 accounts for the locality of memory or other elements to the processing socket.

The fourth stage 604 then shows that array 660 is populated with the selected team members N0-N2 (i.e., the active NICs of all the remaining sockets). In the fifth stage 605, selection module 520 selects one of the team members from array 660. Selection module 520 uses the hash 655 of the header H2, in conjunction with an identified selection algorithm (e.g., a hash-based load balancing algorithm, port based load balancing, balancing based on NIC capacity and/or run time workload, etc.) to select outgoing NIC N2 from array 660.

Finally, in the sixth stage 606, packet 650 is sent from socket S2 through NIC N2 of remote socket S1. In some embodiments, the packets are sent to remote NICs through interconnects (e.g., QPI) that are used for communications between the multiple sockets of a motherboard.

Figure 7:
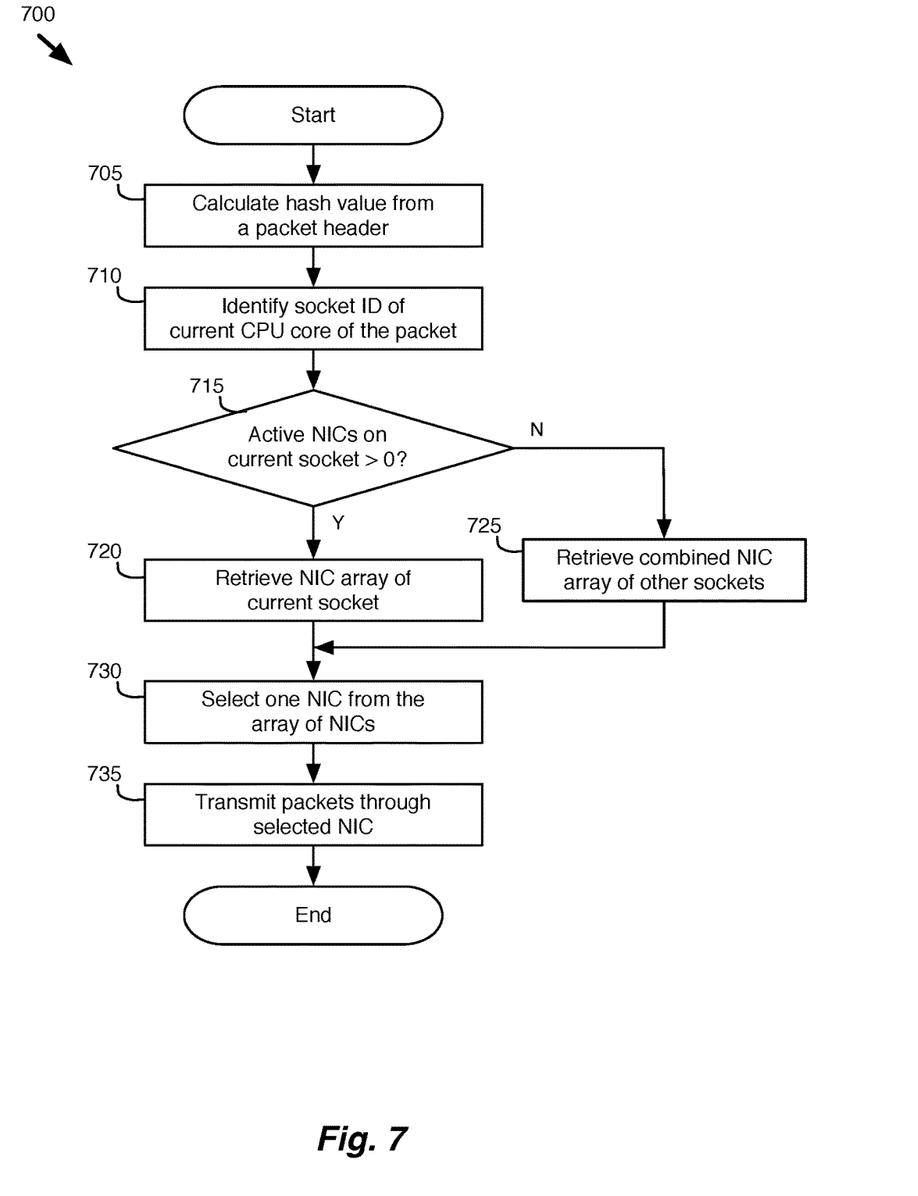
FIG. 7 conceptually illustrates a process for scheduling packets across NICs in a NUMA architecture.

FIG. 7 conceptually illustrates a process for scheduling packets across NICs in a NUMA architecture. The process 700 of some embodiments is performed by a scheduler as described above. The process 700 calculates (at 705) a hash value from a packet header. The packet header may include any portion of the packet, such as L2-L4 headers. The process 700 identifies (at 710) a socket ID of the current processing core from which the packet originates. The process 700 determines (at 715) whether there are any active NICs on the current socket. An active NIC in some embodiments is a NIC that is capable of communicating with a network.

In some embodiments, the process 700 references a data structure (e.g., a table, list, multi-dimensional array, etc.) that stores the number of active NICs associated with each socket. When the process 700 determines (at 715) that there are active NICs on the current socket, the process 700 retrieves (at 720) a list of the active NICs for the current socket.

When the process 700 determines (at 715) that there are no active NICs on the current socket, the process 700 retrieves (at 725) a list (or array) of the active NICs on all of the other sockets. In some embodiments, even when there are active NICs, but the active NICs are otherwise unavailable (e.g., excess load, etc.), the process 700 determines (at 715) that there are no active NICs for the current socket and retrieves (at 725) the array of active NICs from all of the other sockets.

The process 700 then selects (at 730) a particular NIC from the retrieved NIC array (for either the current socket or all of the other sockets). In some embodiments, the process 700 selects (at 730) the particular NIC by using the calculated hash value and a distribution (or selection) algorithm (e.g., load balancing) specified for the process. The process 700 then transmits (at 735) the packet through the selected NIC and the process ends. Scheduling packets for NIC teams based on the localities of the NICs relative to the sockets allows for optimized processing of the packets.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
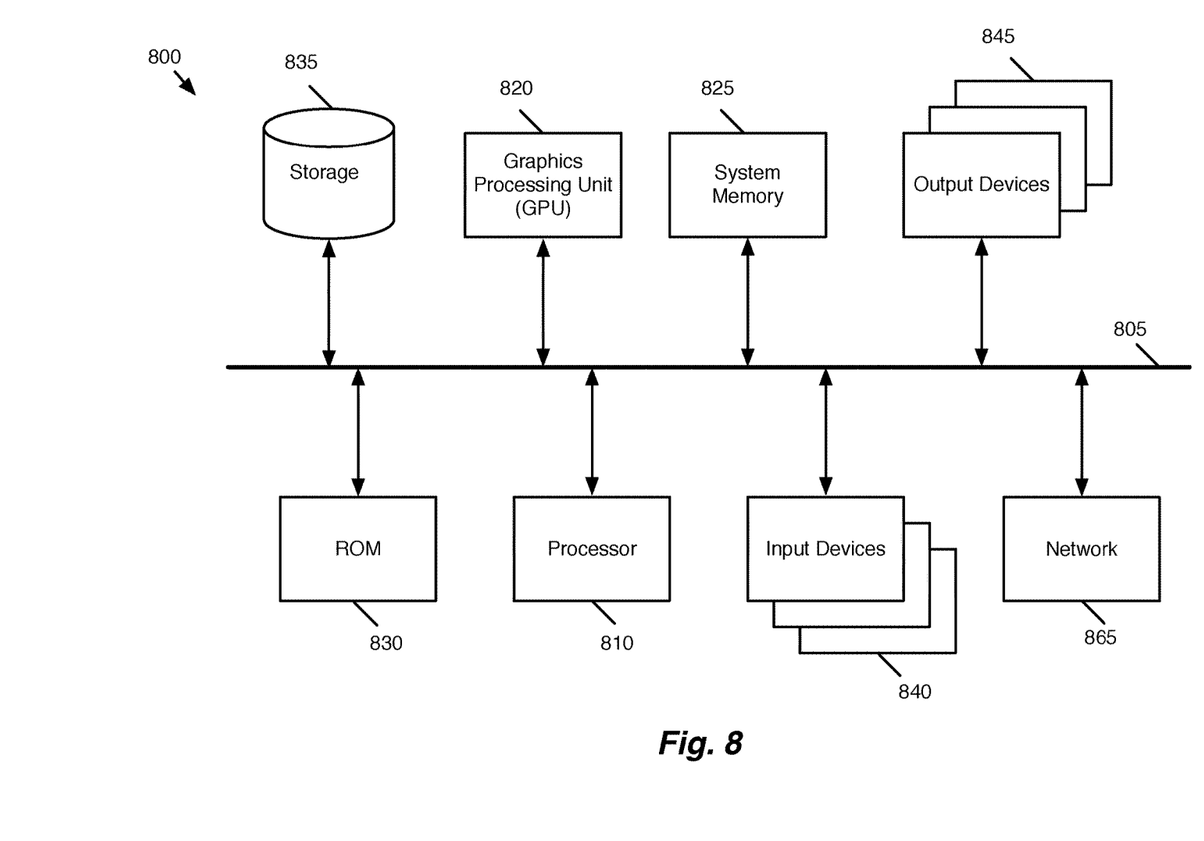
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory machine readable medium storing a program which when executed by a set of processing units distributes packets processed at a plurality of sockets, wherein each socket of the plurality of sockets is associated with a corresponding set of network interface controllers (NICs) local to the socket, wherein at least two NICs local to at least two different sockets are grouped as a NIC team, the program comprising sets of instructions for:
   identifying a socket associated with a packet;
   identifying a NIC team over which to distribute packets associated with the identified socket, at least one NIC of the NIC team local to the identified socket;
   determining whether at least one NIC of the NIC team local to the identified socket is active;
   selecting a particular NIC of the set of teamed NICs by:
      when at least one NIC of the NIC team local to the identified socket is active, retrieving a list of active NICs local to the identified socket from a data structure for the NIC team and selecting the particular NIC from the retrieved list of active local NICs; and
      when none of the NICs of the NIC team local to the identified socket are active, retrieving a list of active NICs local to sockets other than the identified socket from a data structure for the NIC team and selecting the particular NIC from the retrieved list of active NICs local to other sockets; and
   sending the packet to the selected particular NIC.

2. The non-transitory machine readable medium of claim 1, wherein the set of instructions for identifying the socket comprises a set of instructions for determining that the packet is processed by a processing core of the socket.

3. The non-transitory machine readable medium of claim 1, wherein the set of instructions for identifying the socket comprises a set of instructions for determining that the packet is stored in a memory local to the socket.

4. The non-transitory machine readable medium of claim 1, wherein the set of instructions for determining whether at least one NIC of the NIC team local to the identified socket is active comprises a set of instructions for accessing the data structure for the NIC team, wherein the data structure stores a number of active NICs for each socket.

5. The non-transitory machine readable medium of claim 4, wherein the program further comprises sets of instructions for:
   for each socket of the plurality of sockets:
      detecting a status for each NIC local to the socket; and
      storing an identifier and a list of active NICs local to the socket in the data structure.

6. The non-transitory machine readable medium of claim 5, wherein the set of instructions for detecting the status for a specific NIC comprises a set of instructions for determining whether the specific NIC is connected to a network.

7. The non-transitory machine readable medium of claim 1, wherein the data structure stores an identifier for each socket and a list of active NICs local to each socket.

8. The non-transitory machine readable medium of claim 1, wherein the set of instructions for selecting the particular NIC comprises a set of instructions for using a load balancing algorithm to select the particular NIC from the retrieved list of active NICs.

9. The non-transitory machine readable medium of claim 1, wherein the set of instructions for selecting the particular NIC comprises sets of instructions for:
   generating a hash from a portion of the packet; and
   using the generated hash to select the particular NIC from the retrieved list of active NICs.

10. The non-transitory machine readable medium of claim 1, wherein the identified socket is a first socket and the selected particular NIC is local to a second socket, wherein the set of instructions for sending the packet to the selected particular NIC comprises a set of instructions for sending the packet along a set of inter-socket connections to the second socket.

11. A method for distributing packets processed at a plurality of sockets, wherein each socket of the plurality of sockets is associated with a corresponding set of network interface controllers (NICs) local to the socket, wherein at least two NICs local to at least two different sockets are grouped as a NIC team, the method comprising:
   identifying a socket associated with a packet;
   identifying a NIC team over which to distribute packets associated with the identified socket, at least one NIC of the NIC team local to the identified socket;
   determining whether at least one NIC of the NIC team local to the identified socket is active;
   selecting a particular NIC of the set of teamed NICs by:
      when at least one NIC of the NIC team local to the identified socket is active, retrieving a list of active NICs local to the identified socket from a data structure for the NIC team and selecting the particular NIC from the retrieved list of active local NICs; and
      when none of the NICs of the NIC team local to the identified socket are active, retrieving a list of active NICs local to sockets other than the identified socket from a data structure for the NIC team and selecting the particular NIC from the retrieved list of active NICs local to other sockets; and
   sending the packet to the selected particular NIC.

12. The method of claim 11, wherein identifying the socket comprises determining that the packet is processed by a processing core of the socket.

13. The method of claim 11 further comprising:
   for each socket of the plurality of sockets:
      detecting a status for each NIC local to the socket; and
      storing an identifier and a list of active NICs local to the socket in the data structure.

14. The method of claim 11, wherein the data structure stores an identifier for each socket and a list of active NICs local to each socket.

15. The method of claim 11, wherein selecting the particular NIC comprises using a load balancing algorithm to select the particular NIC from the retrieved list of active NICs.

16. The method of claim 11, wherein selecting the particular NIC comprises:
   generating a hash from a portion of the packet; and
   using the generated hash to select the particular NIC from the retrieved list of active NICs.

17. The method of claim 11, wherein the identified socket is a first socket and the selected particular NIC is local to a second socket, wherein sending the packet to the selected particular NIC comprises sending the packet along a set of inter-socket connections to the second socket.

* * * * *